United States Patent
Kim et al.

(10) Patent No.: US 10,714,262 B2
(45) Date of Patent: Jul. 14, 2020

(54) MULTILAYER CAPACITOR

(71) Applicant: SAMSUNG ELECTRO-MECHANICS CO., LTD., Suwon-Si, Gyeonggi-Do (KR)

(72) Inventors: Jeong Ryeol Kim, Suwon-Si (KR); Hyo Sub Kim, Suwon-Si (KR); Kyung Ryul Lee, Suwon-Si (KR); Jun Oh Kim, Suwon-Si (KR); Beom Seock Oh, Suwon-Si (KR); Jong Han Kim, Suwon-Si (KR); Kyoung Jin Cha, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 18 days.

(21) Appl. No.: 16/050,560

(22) Filed: Jul. 31, 2018

(65) Prior Publication Data

US 2019/0304695 A1    Oct. 3, 2019

(30) Foreign Application Priority Data

Mar. 28, 2018 (KR) .......... 10-2018-0036127

(51) Int. Cl.
*H01G 4/30* (2006.01)
*H01G 4/12* (2006.01)
*H01G 4/008* (2006.01)

(52) U.S. Cl.
CPC .......... *H01G 4/30* (2013.01); *H01G 4/008* (2013.01); *H01G 4/1227* (2013.01)

(58) Field of Classification Search
CPC .................. H01G 4/30; H01G 4/008
USPC .......... 361/303, 305, 301.4, 321.1
See application file for complete search history.

(56) References Cited

U.S. PATENT DOCUMENTS

| | | | |
|---|---|---|---|
| 6,316,100 B1 * | 11/2001 | Kodas | B01J 2/003 257/E21.304 |
| 2006/0198078 A1 * | 9/2006 | Miyauchi | H01G 4/008 361/305 |
| 2008/0226487 A1 * | 9/2008 | Akimoto | B22F 1/0088 419/2 |
| 2014/0063685 A1 * | 3/2014 | Lee | H01G 4/008 361/301.4 |
| 2015/0155098 A1 | 6/2015 | Yamaguchi et al. | |
| 2016/0358713 A1 | 12/2016 | Doi et al. | |

FOREIGN PATENT DOCUMENTS

| | | |
|---|---|---|
| KR | 10-2015-0036428 A | 4/2015 |
| KR | 10-2016-0143517 A | 12/2016 |

* cited by examiner

*Primary Examiner* — Arun Ramaswamy
(74) *Attorney, Agent, or Firm* — Morgan, Lewis & Bockius LLP (57) ABSTRACT

A multilayer capacitor includes: a body including dielectric layers and internal electrodes alternately disposed therein; and external electrodes disposed on the body and connected to the internal electrodes, respectively. Each of the internal electrodes includes a Ni grain, ceramics distributed in the Ni grain, a first coating layer surrounding the Ni grain, and second coating layers surrounding the ceramics.

13 Claims, 5 Drawing Sheets

MULTILAYER CAPACITOR

CROSS-REFERENCE TO RELATED APPLICATION(S)

This application claims benefit of priority to Korean Patent Application No. 10-2018-0036127 filed on Mar. 28, 2018 in the Korean Intellectual Property Office, the disclosure of which is incorporated herein by reference in its entirety.

TECHNICAL FIELD

The present disclosure relates to a multilayer capacitor.

BACKGROUND

A multilayer capacitor is a chip-type condenser mounted on the printed circuit boards of various types of electronic products such as an image display apparatus, a liquid crystal display (LCD), a plasma display panel (PDP), or the like, for example, a computer, a smartphone, a cellular phone, or the like, to serve to charge or discharge electricity therein or therefrom.

The multilayer capacitor may be used as a component in various types of electronic apparatuses since it is relatively small, implements high capacitance, and is easily mounted. Recently, in accordance with the miniaturization of electronic apparatuses, demand for miniaturization and a capacitance increase of the multilayer capacitor has been demanded.

In order to miniaturize the multilayer capacitor and increase capacitance of the multilayer capacitor, technology capable of forming an internal electrode and a dielectric layer having reduced thicknesses is required.

Generally, in order to manufacture an internal electrode with a reduced thickness, metal powder particles finer than existing metal powder particles should be used. The reason is that five or six fine metal powder particles should be present in a thickness direction of the internal electrode printed at a reduced thickness in order to suppress a breakage phenomenon at the time of shrinkage of the internal electrode.

However, in the case that metal powder particles finer than existing metal powder particles are used, a shrinkage initiation temperature is decreased, and a difference in shrinkage behaviors between the internal electrode and a ceramic layer is thus increased, such that an internal electrode lumping phenomenon and an internal electrode breakage phenomenon are intensified in a shrinkage process.

SUMMARY

An aspect of the present disclosure may provide a multilayer capacitor including internal electrodes having a reduced thickness, having a reduced thickness deviation, and having excellent connectivity by suppressing an internal electrode lumping phenomenon and an internal electrode broken phenomenon.

According to an aspect of the present disclosure, a multilayer capacitor may include: a body including dielectric layers and internal electrodes alternately disposed therein; and external electrodes disposed on the body and connected to the internal electrodes, respectively. Each of the internal electrodes may include a Ni grain, ceramics distributed in the Ni grain, a first coating layer surrounding the Ni grain, and second coating layers surrounding the ceramics.

The ceramic may include one or more materials selected from the group consisting of $BaTiO_3$, $CaTiO_3$, $SrTiO_3$, $BaZrO_3$, and $CaZrO_3$.

An area fraction of the ceramics included in the internal electrode may be 0.25 to 3.0 area %.

An average particle size of the ceramics may be 30 to 60 nm.

The internal electrode may satisfy 85%≤C in which C is connectivity of the internal electrode corresponding to a ratio of a length of a portion in which the internal electrode is actually formed to an overall length of the internal electrode.

A thickness of the first coating layer may be 1 to 15 nm.

Each of the first and second coating layers may include one or more materials selected from the group consisting of Ag, Au, Zn, Sn, In, Al, Bi, Sb, Ge, and Te.

A thickness of the internal electrode may be 0.3 to 0.8 μm.

The internal electrode may be formed of a conductive paste including conductive powder particles and ceramic materials, and the conductive paste may further include one or more materials selected from the group consisting of Ag, Au, Zn, Sn, In, Al, Bi, Sb, Ge, and Te, a content of the one or more materials being 0.5 to 4.0 wt %, based on a content of the conductive powder particles.

A content of the ceramic materials may be 2 to 15 wt %, based on a content of the conductive powder particles.

An average particle size of the conductive powder particles may be 100 nm or less.

The conductive paste may further include sulfur (S) of which a content is 300 ppm or less (excluding 0) based on a content of the conductive powder particles.

The first and second coating layers may be made of a metal having a melting point lower than that of Ni.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, an X direction refers to a first direction or a length direction, a Y direction refers to a second direction or a width direction, and a Z direction refers to a third direction or a thickness direction.

Multilayer Capacitor

Figure 1:
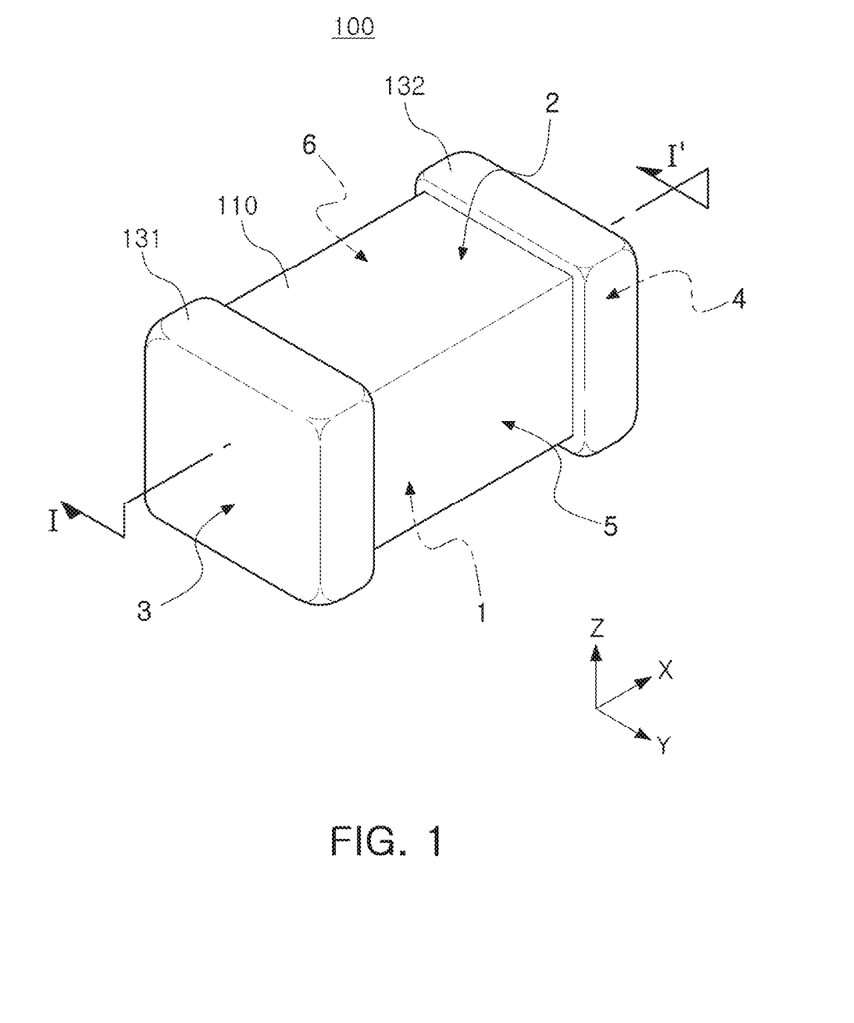
FIG. 1 is a schematic perspective view illustrating a multilayer capacitor according to an exemplary embodiment in the present disclosure.
Figure 2:
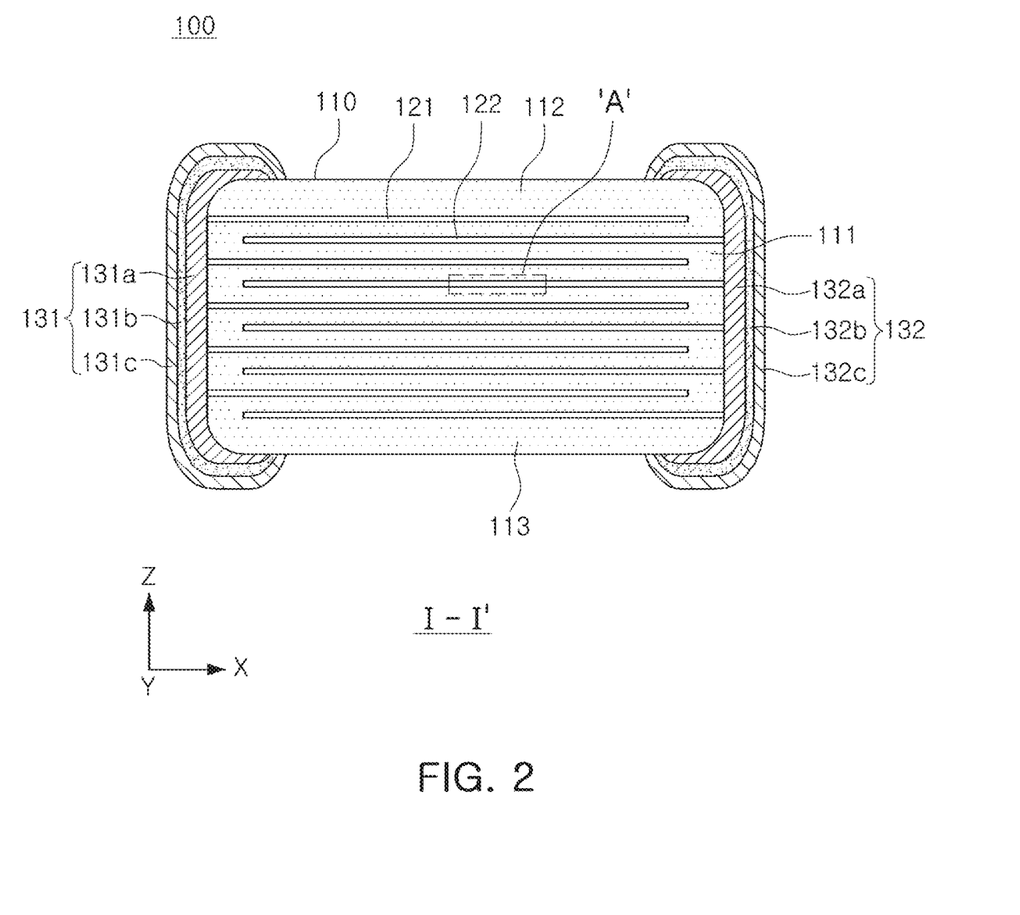
FIG. 2 is a cross-sectional view taken along line I-I' of FIG. 1.
Figure 3:
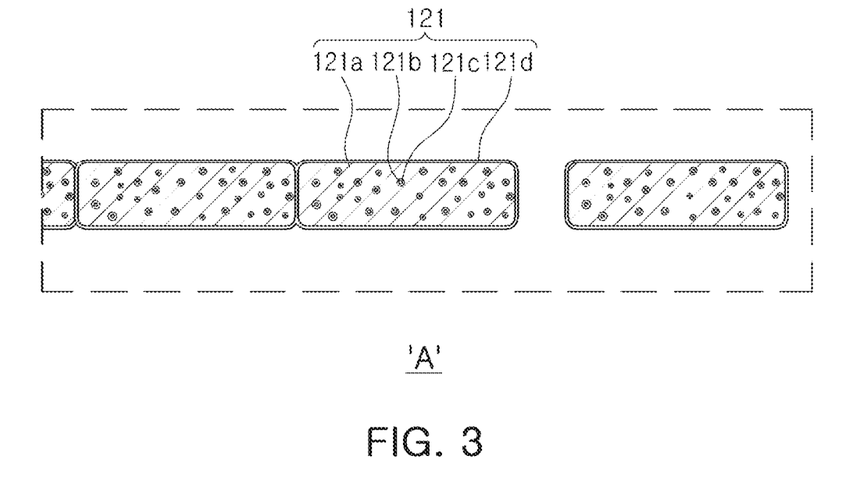
FIG. 3 is an enlarged view of part A of FIG. 2.

FIG. 1 is a schematic perspective view illustrating a multilayer capacitor according to an exemplary embodiment in the present disclosure. FIG. 2 is a cross-sectional view taken along line I-I' of FIG. 1. FIG. 3 is an enlarged view of part A of FIG. 2.

Referring to FIGS. 1 through 3, a multilayer capacitor 100 according to an exemplary embodiment in the present disclosure may include a body 110 including dielectric layers 111 and internal electrodes 121 and 122 alternately disposed therein, and external electrodes 131 and 132 disposed on the body 110 and connected to the internal electrodes 121 and 122, respectively. Each of the internal electrodes 121 and 122 may include a Ni grain, ceramics distributed in the Ni grain, a first coating layer surrounding the Ni grain, and second coating layers surrounding the ceramics.

The body 110 may include the dielectric layers 111 and the internal electrodes 121 and 122 alternately stacked therein.

A shape of the body 110 is not particularly limited, but may be a hexahedral shape or a shape similar to the hexahedral shape, as illustrated in FIG. 1. Although the body 110 does not have a hexahedral shape having perfectly straight lines due to shrinkage of ceramic powder particles included in the body 110 in a sintering process, the body 110 may have a substantially hexahedral shape.

The body 110 may have first and second surfaces 1 and 2 opposing each other in the thickness direction (the Z direction), third and fourth surfaces 3 and 4 connected to the first and second surfaces 1 and 2 and opposing each other in the width direction (the Y direction), and fifth and sixth surfaces 5 and 6 connected to the first and second surfaces 1 and 2, connected to the third and fourth surfaces 3 and 4, and opposing each other in the length direction (the X direction).

A plurality of dielectric layers 111 forming the body 110 may be in a sintered state, and adjacent dielectric layers 111 may be integrated with each other so that boundaries therebetween are not readily apparent without using a scanning electron microscope (SEM).

A raw material of the dielectric layer 111 is not particularly limited as long as sufficient capacitance may be obtained. For example, the raw material of the dielectric layer 111 may be barium titanate ($BaTiO_3$) powder particles. A material of the dielectric layer 111 may be prepared by adding various ceramic additives, organic solvents, plasticizers, binders, dispersing agents, and the like, to powder particles such as the barium titanate ($BaTiO_3$) powder particles, or the like, according to an object of the present disclosure.

The body 110 may include cover layers 112 and 113 formed at an upper portion and a lower portion thereof, respectively. The cover layers 112 and 113 may be formed by stacking dielectric layers on which internal electrodes are not formed. The cover layers 112 and 113 may serve to maintain reliability of the multilayer capacitor against external impact.

Hereinafter, a description will be provided in relation to FIG. 3, which is a view of a first internal electrode 121, but this description may also be applied to a second internal electrode 122.

The internal electrode 121 may include a Ni grain 121a, ceramics 121b distributed in the Ni grain, a first coating layer 121d surrounding the Ni grain, and second coating layers 121c surrounding the ceramics.

Generally, in order to manufacture the internal electrode at a reduced thickness, metal powder particles finer than existing metal powder particles should be used. The reason is that five or six fine metal powder particles should exist in a thickness direction of the internal electrode printed at the reduced thickness in order to suppress a broken phenomenon at the time of shrinkage of the internal electrode.

However, when the metal powder particles finer than the existing metal powder particles should be used, a shrinkage start temperature moves to a low temperature, and a difference in shrinkage behavior between the internal electrode and a dielectric layer is thus increased, such that an internal electrode lumping phenomenon and an internal electrode broken phenomenon are intensified in a shrinkage process.

In the present disclosure, the first coating layer may be formed outside the Ni grain to suppress external growth of the internal electrode, and coated ceramics existing in the Ni grain may suppress movement of Ni to suppress the internal electrode lumping phenomenon and the internal electrode broken phenomenon. Therefore, a multilayer capacitor including internal electrode having a reduced thickness, having a reduced thickness deviation, and having excellent connectivity may be provided.

The Ni grain 121a may be a polyhedron formed by regularly arranging Ni atoms.

Since the ceramics 121b have poor wettability with Ni, the ceramics 121b may serve to suppress movement of Ni particles to suppress the internal electrode lumping phenomenon. The ceramics 121b may be formed by sintering ceramic materials added to a conductive paste for forming the internal electrode and then trapping the ceramic materials in the internal electrode.

A kind of ceramics 121b is not particularly limited as long as the ceramics 121b have poor wettability with Ni. For example, the ceramics 121b may include one or more materials selected from the group consisting of $BaTiO_3$, $CaTiO_3$, $SrTiO_3$, $BaZrO_3$, and $CaZrO_3$.

In this case, an area fraction of the ceramics 121b included in the internal electrode may be 0.25 to 3.0 area %.

When the area fraction of the ceramics 121b is less than 0.25 area %, the ceramics 121b may not sufficiently suppress the movement of the Ni particles, and the internal electrode lumping phenomenon may thus occur. On the other hand, when the area fraction of the ceramics 121b exceeds 3.0 area %, a volume of the ceramic materials in the internal electrode may be increased, such that a thickness of the internal electrode may be increased to decrease an internal electrode thinning effect. Therefore, the area fraction of the ceramics included in the internal electrode may be, preferably, 0.25 to 3.0 area %, more preferably, 0.5 to 3.0 area %.

The area fraction of the ceramics included in the internal electrode (i.e., an area of the ceramics to an area of the internal electrode) may be measured by observing a cross section of the body 110 in a length-thickness (X-Z) direction. For example, the area fraction of the ceramics included in the internal electrode may be measured by observing the cross section of the body 110 in the length-thickness (X-Z) direction at the center of the body 110 in the width direction (the Y direction).

An average particle size of the ceramics 121b may be 30 to 60 nm.

The average particle size of the ceramics 121b may be affected by a size and a content of the ceramic materials added to the conductive paste for forming the internal electrode, a size of conductive powder particles, a content of shrinkage retarding additives, and the like.

In order to control the average particle size of the ceramics 121b to be less than 30 nm, the size and the content of the ceramic materials added to the conductive paste for forming the internal electrode need to be decreased. Therefore, the ceramic material may not sufficient perform a function of suppressing shrinkage of the internal electrode, and a sintering crack defect may thus occur.

On the other hand, when the average particle size of the ceramics 121b exceeds 60 nm, a volume of the ceramics in the internal electrode may be increased, such that a thickness of the internal electrode may be increased, and when the average particle size is great, it may be difficult to effectively suppress shrinkage behavior of the internal electrode.

The first coating layer 121d may surround the Ni grain 121a. That is, the first coating layer may exist on a grain boundary of Ni. The first coating layer 121d may serve to suppress the Ni grain 121a from being externally grown to suppress the internal electrode broken phenomenon and suppress the internal electrode lumping phenomenon.

Figure 4:
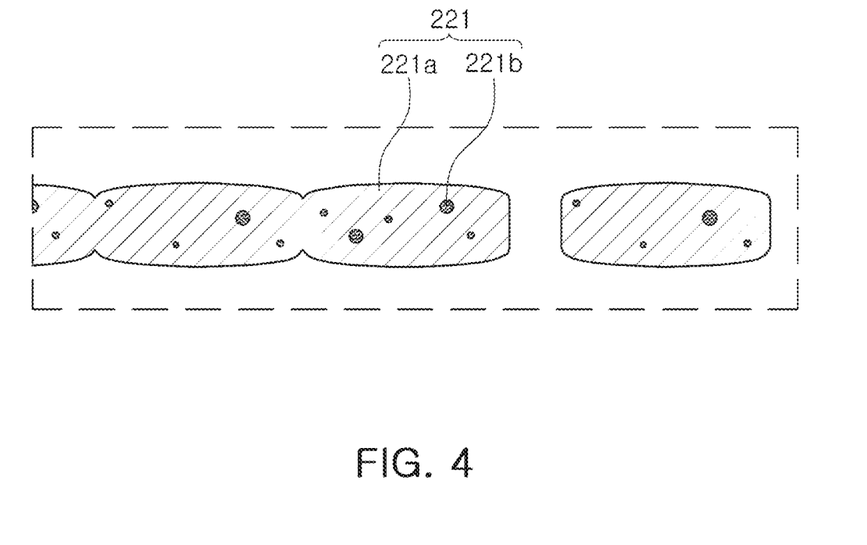
FIG. 4 is an enlarged view of a portion corresponding to part A in a general capacitor according to the related art.

FIG. 4 is an enlarged view of a portion corresponding to part A in a general capacitor according to the related art. It may be seen that since the above-described first coating layer does not exist in the general capacitor according to the related art, external growth of Ni grain 221a in which ceramics 221b is distributed may not be suppressed, such that a thickness deviation of an internal electrode 221 of FIG. 4 is greater than that of FIG. 3.

When a ratio of a length of a portion in which the internal electrode is actually formed to an overall length of the internal electrode (i.e., without considering pores in the internal electrode) in a length-thickness plane is defined as connectivity C of the internal electrode, the first coating layer 121d may suppress the Ni grain 121a from being externally grown, such that the internal electrode 121 may satisfy 85%≤C.

A thickness of the first coating layer 121d may be 1 to 15 nm.

When the thickness of the first coating layer 121d is less than 1 nm, the first coating layer 121d may not sufficiently suppress the Ni grain from being externally grown, and when the thickness of the first coating layer 121d exceeds 15 nm, the thickness of the first coating layer may not be uniform, and coating materials may be lumped, such that an effect of suppressing the Ni grain from being externally grown may be decreased.

The second coating layers 121c may surround outer portions of the ceramics 121b existing in the Ni grain.

The second coating layers 121c may serve to suppress an increase in a size of the ceramics 121b due to a contact between the ceramics 121b existing in the Ni grain.

Each of the first and second coating layers 121d and 121c may include a metal that has a melting point lower than that of Ni, is hardly solid-solved in Ni, and has good wettability with Ni. Such a metal may be added to the conductive paste for forming the internal electrode to uniformly coat a surface of the Ni grain in a sintering process and uniformly coat surface of the ceramics.

An example of the metal that has the melting point lower than that of Ni, is hardly solid-solved in Ni, and has the good wettability with Ni may include Ag, Au, Zn, Sn, In, Al, Bi, Sb, Ge, and Te.

Therefore, each of the first and second coating layers may include one or more materials selected from the group consisting of Ag, Au, Zn, Sn, In, Al, Bi, Sb, Ge, and Te.

A thickness of the internal electrode may be 0.3 to 0.8 μm. Therefore, the number of stacked layers may be increased as compared to a capacitor having the same size, such that capacitance of the multilayer capacitor may be increased, and a size of the multilayer capacitor may be reduced as compared to a capacitor having the same capacitance.

The internal electrode may include conductive powder particles and ceramic materials, and may be formed of a conductive paste including one or more materials selected from the group consisting of Ag, Au, Zn, Sn, In, Al, Bi, Sb, Ge, and Te.

A content of one or more materials selected from Ag, Au, Zn, Sn, In, Al, Bi, Sb, Ge, and Te may be 0.5 to 4.0 wt %, based on a content of the conductive powder particles.

When the content of one or more materials is less than 0.5 wt %, the first and second coating layers may not be sufficiently formed, and when the content of one or more materials exceeds 4.0 wt %, the first and second coating layers may be non-uniformly formed.

An average particle size of the conductive powder particles may be 100 nm or less. When the average particle size of the conductive powder particles exceeds 100 nm, a thickness of the internal electrode may be increased.

A content of the ceramic materials may be 2 to 15 wt %, based on a content of the conductive powder particles.

When the content of the ceramic materials is less than 2 wt %, based on the content of the conductive powder particles, an internal electrode lumping phenomenon may occur.

On the other hand, when the content of the ceramic materials exceeds 15 wt %, based on the content of the conductive powder particles, the ceramics remaining in the internal electrode after a sintering process may be increased, such that a thickness of the internal electrode may be increased, and the ceramic materials may move to the dielectric layer in the sintering process, such that a layer of the dielectric layer may be increased.

In addition, when considering an average particle size of the ceramics included in the internal electrode after the sintering process, an average particle size of the ceramic materials may be 5 to 20 nm.

Meanwhile, the conductive paste may further include sulfur (S) of which a content is 300 ppm or less (excluding 0) based on a content of the conductive powder particles.

Generally, sulfur (S), which is a shrinkage retarding agent, may be included in the conductive paste for forming the internal electrode, but when a content of sulfur exceeds 300 ppm, a thickness difference between the first and second coating layers may be increased, and the first and second coating layers may be non-uniformly formed.

Figure 5:
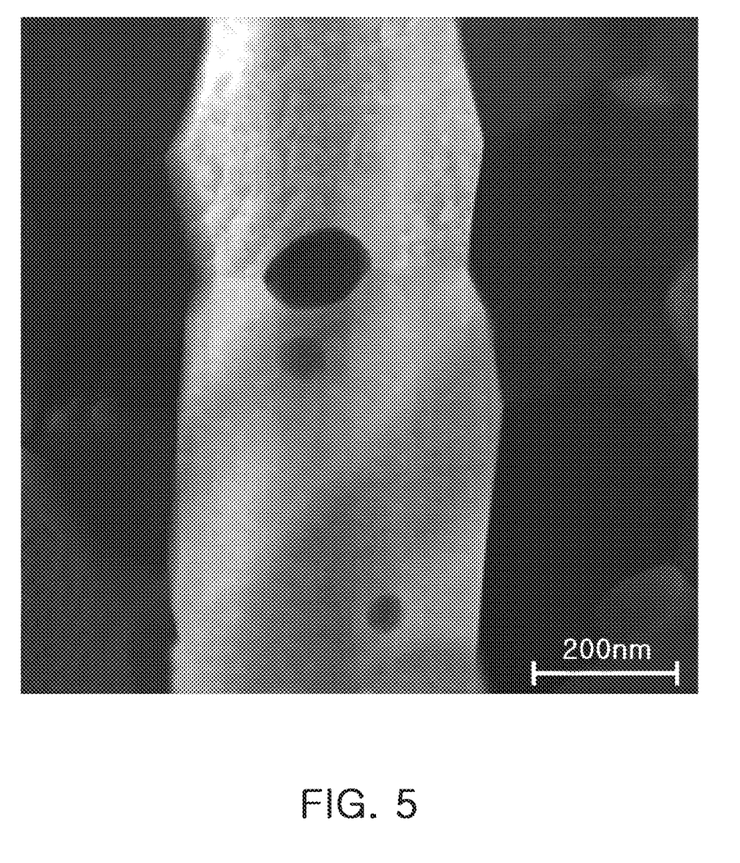
FIG. 5 is a photograph of a microstructure of an internal electrode of the multilayer capacitor according to an exemplary embodiment in the present disclosure.
Figure 6:
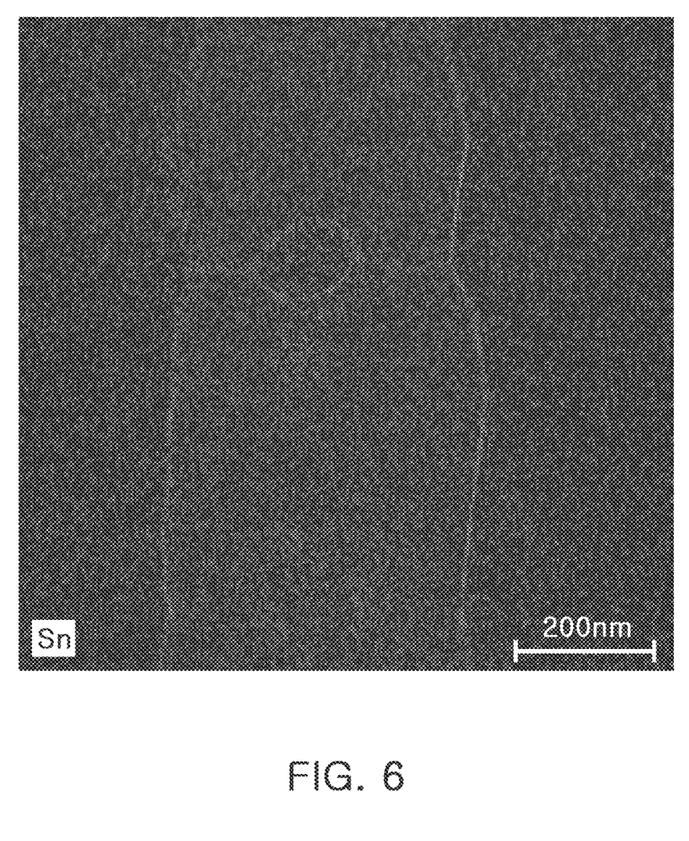
FIG. 6 is a photograph of a distribution of Sn in FIG. 5.

FIG. 5 is a photograph of a microstructure of an internal electrode of the multilayer capacitor according to an exemplary embodiment in the present disclosure. FIG. 6 is a photograph of a distribution of Sn in FIG. 5.

As seen from FIGS. 5 and 6, the first and second coating layers including Sn may exist in a form in which they surround, respectively, the Ni grain and the ceramics included in the internal electrode.

Table 1 represents average values of thicknesses of Sn surrounding Ni grains corresponding to first coating layers and areas and sizes of ceramics included in internal electrodes, measured after manufacturing capacitors while changing contents of Sn and ceramic materials included in a conductive paste for forming an internal electrode.

In addition, connectivity of the internal electrodes, which is ratios of lengths of portions in which the internal electrodes are actually formed to overall lengths of the internal electrodes, is evaluated and represented in Table 1.

TABLE 1

| Test No. | Content of Added Sn/Ni (wt %) | Content of Added Ceramic Materials/Ni (wt %) | Thickness (nm) of First Coating Layer | Area (area %) of Ceramics | Size (nm) of Ceramics | Connectivity (%) of Internal Electrode | Thickness (μm) of Internal Electrode |
|---|---|---|---|---|---|---|---|
| 1* | 0 | 2 | 0 | 0.54 | 22 | Sintering Crack | 1.2 |
| 2* | 0 | 6 | 0 | 1.01 | 30 | 70 | 1.0 |
| 3* | 0 | 10 | 0 | 1.6 | 44 | 83 | 0.90 |
| 4* | 0 | 15 | 0 | 2.44 | 45 | 85 | 0.90 |
| 5* | 0.5 | 2 | 1.5 | 0.51 | 20 | 81 | 0.85 |
| 6 | 0.5 | 6 | 1.5 | 0.61 | 32 | 85 | 0.60 |
| 7 | 0.5 | 10 | 1.5 | 1.49 | 45 | 86 | 0.61 |
| 8 | 0.5 | 15 | 1.5 | 2.26 | 44 | 89 | 0.61 |
| 9* | 1 | 0 | 3 | 0.0 | 0 | 71 | 0.78 |
| 10 | 1 | 2 | 3 | 0.55 | 30 | 86 | 0.47 |
| 11 | 1 | 6 | 3 | 0.82 | 48 | 88 | 0.46 |
| 12 | 1 | 10 | 3 | 1.79 | 54 | 89 | 0.43 |
| 13 | 4 | 0 | 11 | 0.0 | 0 | 69 | 0.72 |
| 14 | 4 | 2 | 11 | 0.57 | 30 | 87 | 0.34 |
| 15 | 4 | 6 | 11 | 0.95 | 47 | 89 | 0.34 |
| 16 | 4 | 10 | 11 | 1.88 | 55 | 90 | 0.32 |
| 17* | 6 | 0 | 16 (Non-uniform) | 0.0 | 0 | 67 | 0.90 |
| 18* | 6 | 2 | 16 (Non-uniform) | 0.45 | 29 | 80 | 0.55 |
| 19* | 6 | 6 | 16 (Non-uniform) | 0.70 | 37 | 84 | 0.56 |

*Comparative examples

It may be seen from the above Table 1 that in Test Nos. 1 to 4 in which Sn is not added, external growth of an internal electrode may not be suppressed, such that a thickness of the internal electrode is great. In addition, in Test Nos. 1 to 3, connectivity of an internal electrode is less than 85%, which is inferior.

In Test Nos. 9 and 13 corresponding to a case in which ceramic materials are not added, connectivity of an internal electrode is inferior.

In Test Nos. 17 to 19, a content of added Sn is excessive, such that coating layers are non-uniformly formed, and connectivity of an internal electrode is thus inferior.

On the other hand, in Test Nos. 6 to 8, 10 to 12, and 14 to 16, an internal electrode may be formed at a reduced thickness of 0.8 μm or less, and connectivity of an internal electrode of 85% or more may be secured.

Meanwhile, the first and second internal electrodes 121 and 122 may be alternately disposed with each of the dielectric layers 111 interposed therebetween, and may be alternately exposed through both end surfaces of the body, respectively. That is, the first and second internal electrodes 121 and 122 may be disposed to be alternately exposed through the third and fourth surfaces 3 and 4 respectively, with each of the dielectric layers 111 interposed therebetween.

The external electrodes 131 and 132 may be disposed on the body 110, and may be connected to the internal electrodes 121 and 122, respectively. As in a form illustrated in FIG. 2, the external electrodes may include first and second external electrodes 131 and 132 disposed on the third and fourth surfaces 3 and 4 of the body, respectively, to be connected to the first and second internal electrodes 121 and 122, respectively. A structure in which the multilayer capacitor 100 includes two external electrodes 131 and 132 is described in the present exemplary embodiment, but the number, shapes, or the like, of external electrodes 131 and 132 may be changed depending on shapes of the internal electrodes 121 and 122 or other purposes.

Meanwhile, the external electrodes 131 and 132 may be formed of any material having electrical conductivity, such as a metal, or the like, a certain material of each of the external electrodes 131 and 132 may be determined in consideration of electrical characteristics, structural stability, or the like, and the external electrodes 131 and 132 may have a multilayer structure.

For example, the external electrodes 131 and 132 may include electrode layers 131a and 132a disposed on the body 110, first plating layers 131b and 132b formed on the electrode layers 131a and 132a, and second plating layers 131c and 132c formed on the first plating layers 131b and 132b, respectively.

As a more specific example, the electrode layers 131a and 132a may be sintered electrodes including a conductive metal and a glass. The conductive metal may be copper (Cu). In addition, the electrode layers 131a and 132a may be resin-based electrodes including a plurality of metal particles and a conductive resin.

The first plating layers 131b and 132b may be Ni plating layers and the second plating layers 131c and 132c may be Sn plating layers, but the first plating layers 131b and 132b and the second plating layers 131c and 132c are not limited thereto.

As set forth above, according to an exemplary embodiment in the present disclosure, the first coating layer surrounding the Ni grain may be formed to suppress external growth of the internal electrode, and coated ceramics existing in the Ni grain may suppress movement of Ni to suppress the internal electrode lumping phenomenon and the internal electrode broken phenomenon. Therefore, a multilayer capacitor including internal electrode having a reduced thickness, having a reduced thickness deviation, and having excellent connectivity may be provided.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a body including dielectric layers and internal electrodes alternately disposed therein; and
external electrodes disposed on the body and connected to the internal electrodes, respectively,
wherein each of the internal electrodes includes:
a Ni grain,
ceramic particles,
a first coating layer, and
second coating layers respectively surrounding the ceramic particles, and distributed in the Ni grain, and
wherein the first coating layer surrounds the Ni grain, and the second coating layers.

2. The multilayer capacitor of claim 1, wherein the ceramic particles include one or more materials selected from the group consisting of $BaTiO_3$, $CaTiO_3$, $SrTiO_3$, $BaZrO_3$, and $CaZrO_3$.

3. The multilayer capacitor of claim 1, wherein an area fraction of the ceramic particles included in the internal electrode is 0.25 to 3.0 area %.

4. The multilayer capacitor of claim 1, wherein an average particle size of the ceramic particles 30 to 60 nm.

5. The multilayer capacitor of claim 1, wherein the internal electrode satisfies 85%≤C, in which C is connectivity of the internal electrode corresponding to a ratio of a length of a portion in which the internal electrode is actually formed to an overall length of the internal electrode.

6. The multilayer capacitor of claim 1, wherein a thickness of the first coating layer is 1 to 15 nm.

7. The multilayer capacitor of claim 1, wherein each of the first and second coating layers includes one or more materials selected from the group consisting of Ag, Au, Zn, Sn, In, Al, Bi, Sb, Ge, and Te.

8. The multilayer capacitor of claim 1, wherein a thickness of the internal electrode is 0.3 to 0.8 μm.

9. The multilayer capacitor of claim 1, wherein the internal electrode is formed of a conductive paste including conductive powder particles and ceramic materials, and
the conductive paste further includes one or more materials selected from the group consisting of Ag, Au, Zn, Sn, In, Al, Bi, Sb, Ge, and Te, a content of the one or more materials being 0.5 to 4.0 wt %, based on a content of the conductive powder particles.

10. The multilayer capacitor of claim 9, wherein a content of the ceramic materials is 2 to 15 wt %, based on a content of the conductive powder particles.

11. The multilayer capacitor of claim 9, wherein an average particle size of the conductive powder particles is 100 nm or less.

12. The multilayer capacitor of claim 9, wherein the conductive paste further includes sulfur (S) of which a content is 300 ppm or less (excluding 0) based on a content of the conductive powder particles.

13. The multilayer capacitor of claim 1, wherein the first and second coating layers are made of a metal having a melting point lower than that of Ni.

* * * * *